(12) United States Patent
Tetsuka et al.

(10) Patent No.: US 8,296,034 B2
(45) Date of Patent: Oct. 23, 2012

(54) VEHICLE SPEED LIMITING SYSTEM

(75) Inventors: Takashi Tetsuka, Wako (JP); Kenichi Machida, Wako (JP); Yukihiro Asada, Wako (JP); Masanori Nakamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/257,359

(22) PCT Filed: Mar. 31, 2010

(86) PCT No.: PCT/JP2010/055874
§ 371 (c)(1),
(2), (4) Date: Sep. 19, 2011

(87) PCT Pub. No.: WO2010/114025
PCT Pub. Date: Oct. 7, 2010

(65) Prior Publication Data
US 2012/0016562 A1    Jan. 19, 2012

(30) Foreign Application Priority Data

Mar. 31, 2009  (JP) ................................. 2009-087261

(51) Int. Cl.
*B60T 8/32*  (2006.01)

(52) U.S. Cl. ................ 701/93; 701/51; 701/56; 701/97; 701/110; 477/36; 477/9; 477/108; 477/120; 477/131; 477/144; 477/151; 477/156; 477/188; 123/350; 123/352; 192/3.31

(58) Field of Classification Search .................... 701/22, 701/51, 56, 93, 97, 110; 180/170, 178, 179, 180/247, 248; 477/36, 97, 108, 188, 120, 477/131, 144, 151, 156; 123/350, 352; 192/3.31
See application file for complete search history.

(56) References Cited

U.S. PATENT DOCUMENTS

| | | | | |
|---|---|---|---|---|
| 4,653,005 A | * | 3/1987 | Osanai et al. | 701/62 |
| 4,917,206 A | * | 4/1990 | Hara | 180/179 |
| 6,157,885 A | * | 12/2000 | Sakaguchi et al. | 701/54 |
| 6,480,775 B2 | * | 11/2002 | Cho | 701/51 |
| 6,769,419 B2 | * | 8/2004 | Kanai et al. | 123/520 |
| 7,315,779 B1 | * | 1/2008 | Rioux et al. | 701/114 |

(Continued)

FOREIGN PATENT DOCUMENTS

JP           1-110849          4/1989

(Continued)

*Primary Examiner* — James Trammell
*Assistant Examiner* — McDieunel Marc
(74) *Attorney, Agent, or Firm* — Birch, Stewart, Kolasch & Birch, LLP

(57) ABSTRACT

To provide a vehicle speed limiting system that is capable of executing a maximum speed limiting control without influencing a driving feeling of a vehicle. A vehicle speed limiting system includes: a three-dimensional map 46a and a throttle valve driving unit 47. A first maximum speed limiter opening degree is calculated by adding a first predetermined opening degree, a second predetermined opening degree, and a current throttle valve opening degree, the first predetermined opening degree being calculated by multiplying a speed difference of the vehicle by a preset P-term coefficient, the second predetermined opening degree being calculated by multiplying an acceleration of the vehicle by a preset D-term coefficient. Once the calculated first maximum speed limiter opening degree falls below the target throttle valve opening degree θB, the throttle valve motor 30 is driven on a basis of the first maximum speed limiter opening degree.

11 Claims, 12 Drawing Sheets

U.S. PATENT DOCUMENTS

| | | |
|---|---|---|
| 7,475,746 B2 | 1/2009 | Tsukada et al. |
| 7,530,345 B1 * | 5/2009 | Plante et al. ................... 123/361 |
| 8,180,550 B2 * | 5/2012 | Oshima et al. .................. 701/90 |
| 2006/0065239 A1 | 3/2006 | Tsukada et al. |
| 2009/0173562 A1 * | 7/2009 | Namari et al. ................ 180/179 |
| 2012/0016569 A1 * | 1/2012 | Asada et al. .................. 701/104 |

FOREIGN PATENT DOCUMENTS

| | | |
|---|---|---|
| JP | 2-196146 | 8/1990 |
| JP | 7-197839 A | 8/1995 |
| JP | 2004-116760 A | 4/2004 |
| JP | 2006-104953 A | 4/2006 |

\* cited by examiner

VEHICLE SPEED LIMITING SYSTEM

TECHNICAL FIELD

The present invention relates to a vehicle speed limiting system, and particularly relates to a vehicle speed limiting system to be employed in a vehicle in which a throttle valve is driven by a motor.

BACKGROUND ART

Conventionally, a vehicle speed limiting system has been known that limits an engine output so that the speed of a vehicle should not exceed a preset maximum speed.

Patent Literature 1 discloses a vehicle speed limiting system. The vehicle speed limiting system is configured to limit an injection amount of a fuel injection system when the speed of a vehicle is about to reach a preset maximum speed. The vehicle speed limiting system thereby limits an engine output to prevent the speed of the vehicle from exceeding the maximum speed.

CITATION LIST

Patent Literature

[Patent Literature 1] Japanese Unexamined Patent Application Publication No. 7-197839

SUMMARY OF INVENTION

Technical Problem

However, the vehicle speed limiting system described in Patent Literature 1 is that which decreases the number of times of injection by employing an intermittent injection in order to reduce the amount of fuel supplied. Accordingly, the vehicle speed limiting system has a problem of influencing the driving feeling with the repetition of on and off of injection. In addition, if the cycle of on and off of injection is finely set at a shorter cycle in order to improve the driving feeling, the setting may affect the combustion state, in turn increasing the temperature of a catalyst.

An object of the present invention is to solve the above-described problems of the conventional technique, and thus to provide a vehicle speed limiting system that is capable of executing a maximum-speed limiting control without greatly influencing the driving feeling.

Solution to Problem

In order to achieve the above-described object, a first aspect of the present invention is a vehicle speed limiting system (40) having a throttle-by-wire mechanism that drives a throttle valve (28) using a motor (30). The vehicle speed limiting system includes: a three-dimensional map (46a) that is provided to each of gear stages of a transmission (60) and from which to derive a target throttle valve opening degree ($\theta$B) of the throttle valve (28) on a basis of a throttle grip opening degree ($\theta$A) and an engine speed; and a throttle valve driving unit (47) that drives the motor (30) in accordance with the target throttle valve opening degree. In the vehicle speed limiting system, when a speed of a vehicle (1) is about to exceed a preset maximum speed, the throttle valve driving unit (47) drives the motor (30) in such a manner that the speed of the vehicle (1) does not exceed the preset maximum speed, irrespective of the target throttle valve opening degree ($\theta$B) derived from the three-dimensional map (46a).

In addition, a second aspect of the present invention is the vehicle speed limiting system, further including: speed difference calculating means for calculating a difference between a current speed of the vehicle (1) and the preset maximum speed; acceleration calculating means for calculating an acceleration of the vehicle (1); and maximum speed limiter opening degree calculating means (43) for calculating a first maximum speed limiter opening degree by adding a first predetermined opening degree, a second predetermined opening degree, and a current throttle valve opening degree, the first predetermined opening degree being calculated by multiplying the speed difference by a preset P-term coefficient, the second predetermined opening degree being calculated by multiplying the acceleration by a preset D-term coefficient. In the vehicle speed limiting system, the throttle valve driving unit (47) is configured to drive the motor (30) on a basis of the first maximum speed limiter opening degree once the calculated first maximum speed limiter opening degree falls below the target throttle valve opening degree ($\theta$B) derived on a basis of the three-dimensional map (46a).

A third aspect of the present invention is the vehicle speed limiting system, further including low-select means (45) for switching the first maximum speed limiter opening degree to a second maximum speed limiter opening degree in accordance with a change rate of the throttle grip opening degree ($\theta$A) when the throttle grip opening degree ($\theta$A) becomes small during execution of maximum speed limiting using the first maximum speed limiter opening degree, the second maximum speed limiter opening degree being smaller than the first maximum speed limiter opening degree.

A fourth aspect of the present invention is the vehicle speed limiting system, being applied to an engine (54) having a plurality of cylinders, the engine (54) is configured to change a number of cylinders being operated (S) by stopping at least one of the plurality of cylinders in accordance with a state of an operation of the vehicle (1), a plurality of motors (63A, 63B and 63CD) that drives the throttle valve (67) and that is equal in number to a number of stages of change of the number of cylinders being operated (S) is provided, and the vehicle speed limiting system (40) sets a target throttle valve opening degree (THVm) in accordance with the number of cylinders being operated (S) when the current vehicle speed (Vs) reaches a preset set maximum vehicle speed (Vm), and uses the target throttle valve opening degree (THVm) to control the plurality of motors (63A, 63B and 63CD).

A fifth aspect of the present invention is the vehicle speed limiting system wherein a maximum speed limit target torque (Qm) in which the current vehicle speed (Vs) reaches the set maximum vehicle speed (Vm) is operated, then the maximum speed limit target torque (Qm) is converted into a target throttle grip opening degree (THGm) and then the target throttle valve opening degree (THVm) is calculated as a value allocated to the number of cylinders being operated (S) determined by the target throttle grip opening degree (THGm).

A sixth aspect of the present invention is the vehicle speed limiting system calculating a feedback operation amount (FB) based on a vehicle speed difference (P) between the set maximum vehicle speed (Vm) and the current vehicle speed (Vs), and an amount of variation in the vehicle speed difference, and calculating the maximum speed limit target torque (Qm) by adding a target torque current value (Qn) converted into the target throttle grip opening degree (THGm) in a previous process to the feedback operation amount (FB).

A seventh aspect of the present invention is the vehicle speed limiting system calculating a requirement torque (Qy)

of the engine (54) using a three-dimensional map having parameters that are a throttle grip opening degree (THG) detected by a throttle-grip opening degree sensor (27), an engine speed (NE) detected by an engine speed sensor (34) and a gear position (GP) detected by a gear position sensor (33), and the target torque current value (Qn) used for limiting the maximum speed is determined by low-select process for selecting a lower one of the requirement torque (Qy) and the maximum speed limit target torque (Qm).

A eighth aspect of the present invention is the vehicle speed limiting system wherein the three-dimensional map for calculating the requirement torque (Qy) has requirement torque data for preventing the current vehicle speed (Vs) from exceeding the set maximum vehicle speed (Vm) in a predetermined throttle grip opening degree region where the current vehicle speed (Vs) exceeds the set maximum vehicle speed (Vm) and a predetermined engine speed region.

A ninth aspect of the present invention is the vehicle speed limiting system wherein the feedback operation amount (FB) is calculated using a P-term coefficient (Kp) by which the vehicle speed difference (P) is multiplied and a D-term coefficient (Kd) by which an amount of variation (D) in the vehicle speed difference is multiplied, and the P-term coefficient (Kp) and the D-term coefficient (Kd) are formed with values (Kpt and Kdt) applied when the current vehicle speed (Vs) is higher than the set maximum vehicle speed (Vm) and values (Kpb and Kdb) applied when the current vehicle speed (Vs) is lower than the set maximum vehicle speed (Vm).

A tenth aspect of the present invention is the vehicle speed limiting system wherein it is set so that, when the current vehicle speed (Vs) exceeds the set maximum vehicle speed (Vm), the P-term coefficient (Kp) and the D-term coefficient (Kd) are increased, whereas, when the current vehicle speed (Vs) is lower than the set maximum vehicle speed (Vm), the P-term coefficient (Kp) and the D-term coefficient (Kd) are decreased, and it is also set so that, as the number of cylinders being operated (S) is decreased, the P-term coefficient (Kp) and the D-term coefficient (Kd) are increased.

A eleventh aspect of the present invention is the vehicle speed limiting system wherein a throttle valve actual opening degree (THVj) for a cylinder being operated among the plurality of cylinders is calculated by adding the target throttle valve opening degree (THVm) to an idle opening degree for maintaining a number of revolutions of idling of the engine (54).

A twelfth aspect of the present invention is the vehicle speed limiting system, when the cylinder is stopped, an opening degree of the throttle valve (64) of the stopped cylinder is switched to the idle opening degree.

Advantageous Effects of Invention

According to the first aspect, the vehicle speed limiting system includes: the three-dimensional map that is provided to each of the gear stages of the transmission and from which to derive the target throttle valve opening degree of the throttle valve on the basis of the throttle grip opening degree and the engine speed; and the throttle valve driving unit that drives the motor in accordance with the target throttle valve opening degree. In addition, when the speed of a vehicle is about to exceed the preset maximum speed, the throttle valve driving unit drives the motor in such a manner that the speed of the vehicle does not exceed the preset maximum speed, irrespective of the target throttle valve opening degree derived from the three-dimensional map. Accordingly, an influence to be given to the driving feeling of the vehicle is suppressed as compared to the systems that reduce the engine output by reducing the number of times of fuel injection or by ignition cut. As a result, a smooth maximum speed limiting control can be executed without giving any discomfort to the rider. Furthermore, the target throttle valve opening degree map for each gear stage of the transmission enables an optimum setting of the throttle valve opening degree with no consideration of the limit of vehicle speed, and thus allows the vehicle speed to be limited with various speeds without changing the setting of the map in conformity with any of maximum speed limitations that are different from one country to another.

According to the second aspect, the vehicle speed limiting system further includes the speed difference calculating means for calculating a difference between a current speed of the vehicle and the preset maximum speed; the acceleration calculating means for calculating an acceleration of the vehicle; and the maximum speed limiter opening degree calculating means for calculating the first maximum speed limiter opening degree by adding the first predetermined opening degree calculated by multiplying the speed difference by the preset P-term coefficient, the second predetermined opening degree calculated by multiplying the acceleration by the preset D-term coefficient, and the current throttle valve opening degree. In addition, the throttle valve driving unit is configured to drive the motor on the basis of the first maximum speed limiter opening degree once the calculated first maximum speed limiter opening degree falls below the target throttle valve opening degree derived on the basis of the three-dimensional map. Accordingly, the setting of the throttle valve opening degree in accordance with the difference between the current speed and the maximum speed as well as with the acceleration of the vehicle makes it possible to smooth the speed change of the vehicle from a state where the speed has approached the maximum speed to a state where the speed reaches the maximum speed. This eliminates, for example, such a case where the engine output is largely decreased to cause a large deceleration at the time when the speed of the vehicle reaches the maximum speed. As a result, a smooth maximum speed limiting control can be executed.

According to the third aspect, the vehicle speed limiting system further includes the low-select means for switching the first maximum speed limiter opening degree to the second maximum speed limiter opening degree, which is smaller than the first maximum speed limiter opening degree, in accordance with the change rate of the throttle grip opening degree when the throttle grip opening degree becomes small during the execution of the maximum speed limiting using the first maximum speed limiter opening degree. Accordingly, for example, even when the throttle grip is rapidly returned during the execution of the maximum speed limiting control, it is possible to switch the first maximum speed limiter opening degree to the second maximum speed limiter opening degree in response to the rotation operation of the throttle grip. This makes it possible to prevent an occurrence of the phenomenon where the throttle valve is not driven in the closing direction until the target throttle valve opening degree falls below the first maximum speed limiter opening degree even when the rider rotates the throttle grip in the closing direction. As a result, a smooth deceleration with no free running feeling can be achieved by giving no discomfort to the rider.

According to the fourth aspect, the vehicle speed limiting system is applied to an engine having a plurality of cylinders, the engine is configured to change a number of cylinders being operated by stopping at least one of the plurality of cylinders in accordance with a state of an operation of the vehicle, a plurality of motors that drives the throttle valve and that is equal in number to a number of stages of change of the number of cylinders being operated is provided, and the vehicle speed limiting system sets a target throttle valve opening degree in accordance with the number of cylinders being operated when the current vehicle speed reaches a preset set maximum vehicle speed, and uses the target throttle valve opening degree to control the plurality of motors. Therefore, for example, in an engine having a cylinder stop mechanism that can change the number of cylinders being operated from four to three and to two, the target throttle valve opening degree in accordance with the number of cylinders being operated is set, and thus it is possible to limit the maximum speed of a vehicle.

According to the fifth aspect, a maximum speed limit target torque in which the current vehicle speed reaches the set maximum vehicle speed is operated, then the maximum speed limit target torque is converted into a target throttle grip opening degree and then the target throttle valve opening degree is calculated as a value allocated to the number of cylinders being operated determined by the target throttle grip opening degree. Therefore, when the number of cylinders being operated is changed, the target throttle valve opening degree for achieving the same predetermined vehicle speed is changed, even in this case, since the maximum speed limit target torque is temporarily converted into the target throttle grip opening degree, it is possible to set the throttle valve opening degree in accordance with the number of cylinders being operated and thereby limit the maximum speed.

According to the sixth aspect, the vehicle speed limiting system calculates a feedback operation amount based on a vehicle speed difference between the set maximum vehicle speed and the current vehicle speed, and an amount of variation in the vehicle speed difference, and calculates the maximum speed limit target torque by adding a target torque current value converted into the target throttle grip opening degree in a previous process to the feedback operation amount. Therefore, it becomes easier to execute a calculation process for the feedback operation amount for preventing the vehicle speed from exceeding the set maximum vehicle speed and a calculation process for the maximum speed limit target torque.

According to the seventh aspect, the vehicle speed limiting system calculates a requirement torque of the engine using a three-dimensional map having parameters that are a throttle grip opening degree detected by a throttle-grip opening degree sensor, an engine speed detected by an engine speed sensor and a gear position detected by a gear position sensor, and the target torque current value used for limiting the maximum speed is determined by low-select process for selecting a lower one of the requirement torque and the maximum speed limit target torque. Therefore, for example, when, under control using the three-dimensional map in which the throttle grip opening degree, the engine speed and the gear position are parameters, the vehicle speed is about to exceed the set maximum vehicle speed, the maximum speed limit target torque smaller than the requirement torque is used, and thus it becomes possible to limit the maximum speed.

According to the eighth aspect, the three-dimensional map for calculating the requirement torque has requirement torque data for preventing the current vehicle speed from exceeding the set maximum vehicle speed in a predetermined throttle grip opening degree region where the current vehicle speed exceeds the set maximum vehicle speed and a predetermined engine speed region. Therefore, although, normally, the throttle valve is driven in accordance with the requirement torque calculated from the three-dimensional map and thus the maximum speed is limited, ager the engine is shaken down and thus the engine output exceeds a design value or when a road surface is downhill, since the maximum speed limit target torque obtained by performing feedback control on the throttle value opening degree resulting from conversion of the requirement torque is smaller than the requirement torque calculated from the three-dimensional map, the smaller one is used as a target torque determination value through the low-select process, and the throttle valve opening degree in accordance with it is applied, and thus it is possible to limit the maximum speed.

According to the ninth aspect, the feedback operation amount is calculated using a P-term coefficient by which the vehicle speed difference is multiplied and a D-term coefficient by which an amount of variation in the vehicle speed difference is multiplied, and the P-term coefficient and the D-term coefficient are formed with values applied when the current vehicle speed is higher than the set maximum vehicle speed and values applied when the current vehicle speed is lower than the set maximum vehicle speed. Therefore, it is possible to change the gain of the feedback control according to whether the current vehicle speed exceeds the set maximum vehicle speed.

According to the tenth aspect, it is set so that, when the current vehicle speed exceeds the set maximum vehicle speed, the P-term coefficient and the D-term coefficient are increased, whereas, when the current vehicle speed is lower than the set maximum vehicle speed, the P-term coefficient and the D-term coefficient are decreased, and it is also set so that, as the number of cylinders being operated is decreased, the P-term coefficient and the D-term coefficient are increased. Therefore, it is possible to set so that, when the current vehicle speed exceeds the set maximum vehicle speed, the feedback gain is increased and thus the current vehicle speed is rapidly returned to the set maximum vehicle speed whereas, when the current vehicle speed is lower than the set maximum vehicle speed, the feedback gain is decreased and thus the current vehicle speed slowly reaches the set maximum vehicle speed. Moreover, when the number of cylinders being operated is small, since a large torque is produced in each throttle valve and the throttle valve is widely opened, it is possible to set so that the feedback gain is increased and thus convergence is increased.

According to the eleventh aspect, a throttle valve actual opening degree for a cylinder being operated among the plurality of cylinders is calculated by adding the target throttle valve opening degree to an idle opening degree for maintaining a number of revolutions of idling of the engine. Therefore, it becomes possible to perform appropriate control on the maximum speed limit even in an engine that does not have a bypass passage for an idling operation and that performs the idling operation by slightly opening the throttle valve.

According to the twelfth aspect, when the cylinder is stopped, an opening degree of the throttle valve (64) of the stopped cylinder is switched to the idle opening degree. Therefore, it is possible to effectively perform the maximum speed limit even in an engine that switches the throttle valve to the idle opening degree when the cylinders are stopped.

DESCRIPTION OF EMBODIMENTS

Figure 1:
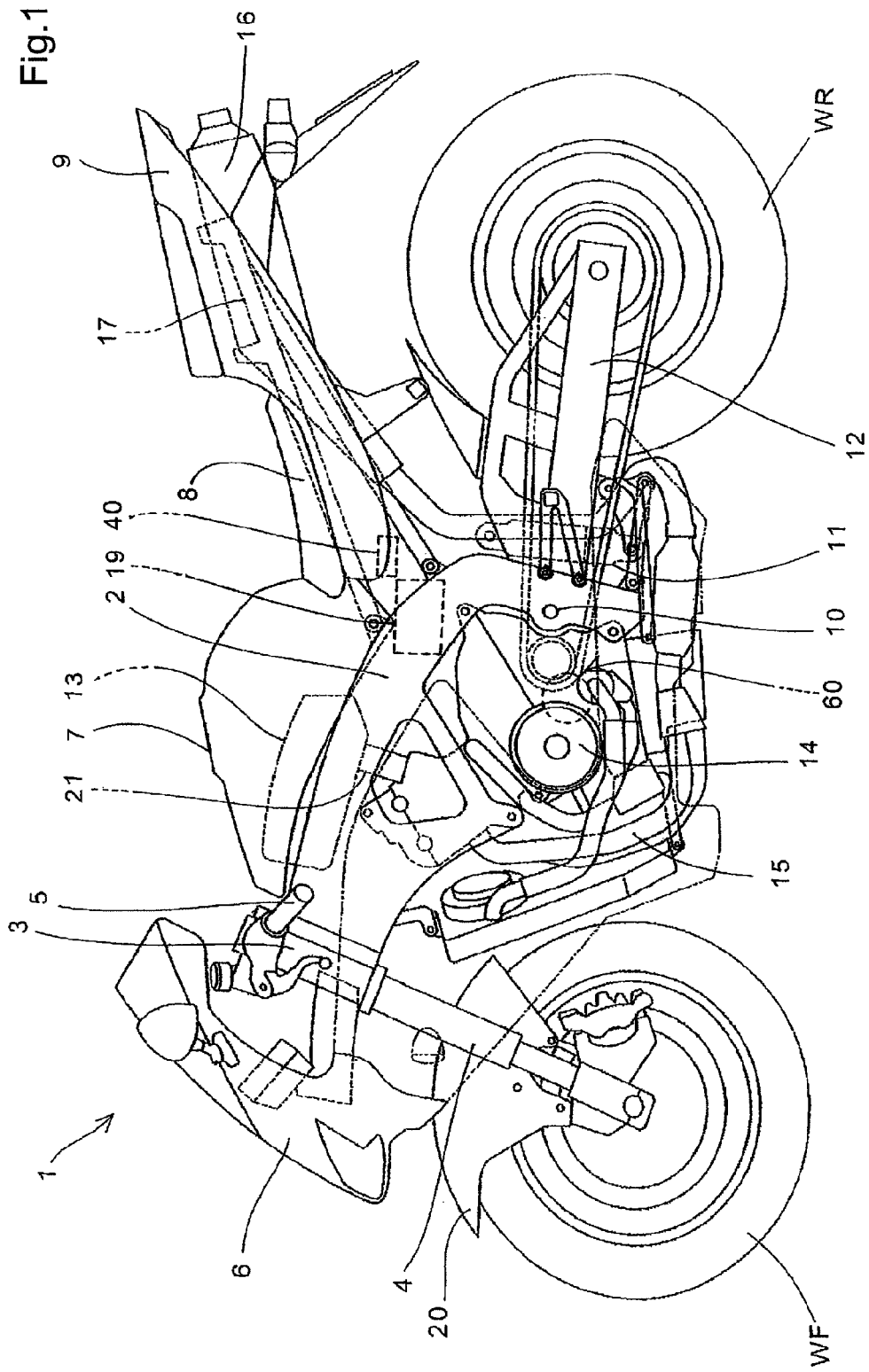
FIG. 1 is a side view of a motorcycle employing an engine output control system according to an embodiment of the present invention.

Hereinafter, a preferred embodiment of the present invention will be described in detail with reference to the drawings. FIG. 1 is a side view of a motorcycle 1 in which an engine output control system according to an embodiment of the present invention is employed. A head pipe 3 is provided at a front end portion of a main frame 2, and an unillustrated steering stem is rotatably supported on the head pipe 3. A pair of left and right front forks 4 are attached to the steering stem. A front wheel WF is rotatably supported by the front forks 4. The front wheel WF is steerable by use of a pair of left and right handlebars 5 attached to an upper end of the front forks 4.

A swing arm 12 is swingably supported by a pivot shaft 10 at a lower portion on the rear side of the main frame 2. A rear wheel WR that serves as a driving wheel is rotatably supported by the swing arm 12. A rear cushion 11 is disposed between the swing arm 12 and the main frame 2. The rear cushion 11 links the swing arm 12 and the main frame 2 to each other with a link mechanism.

An engine 14 is disposed forward of the pivot shaft 10 and below the main frame 2. Inside the engine 14, a multi-speed, for example, 6-speed transmission 60 is housed. An intake pipe 21 including a fuel injection device and a throttle body is attached to an upper portion of the engine 14, and an air cleaner box 13 is connected to an upper portion of the intake pipe 21. An exhaust pipe 15 is attached to a front side of the engine 14. The exhaust pipe 15 guides a combustion gas of the engine 14 to a muffler 16 disposed at a rear end portion of the vehicle body.

A front cowl 6 is disposed at a front side of the head pipe 3. A front fender 20 is disposed above the front wheel WF. A fuel tank 7 is disposed above the main frame 2. A seat 8 and a seat cowl 9 are attached onto a seat frame 17 extending rearward and upward from the main frame 2. A battery 19 and an ECU 40 that serves as the vehicle speed limiting system are disposed below the seat 8.

Figure 2:
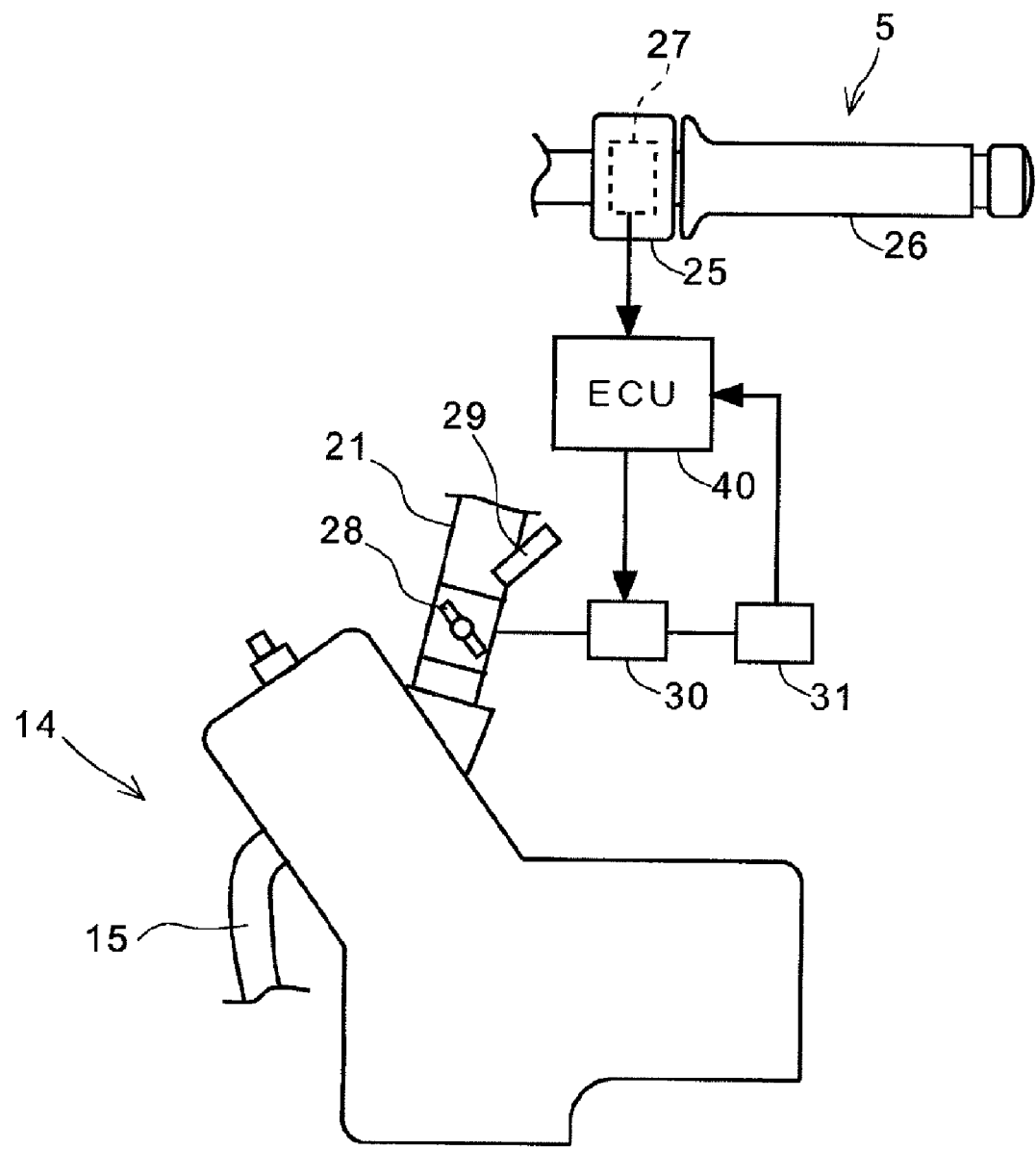
FIG. 2 is a block diagram showing a configuration of a throttle-by-wire mechanism.

FIG. 2 is a block diagram showing a configuration of a throttle-by-wire mechanism. The same reference numerals as those described above indicate the same or equivalent parts. The motorcycle 1 according to the embodiment employs a throttle-by-wire (TBW) mechanism that drives a throttle valve 28 with a throttle valve motor 30, the throttle valve 28 changing a passage area of the intake pipe 21. Note that an injector 29 of the fuel injection device is disposed upstream of the throttle valve 28.

A throttle grip 26 is attached to the handlebar 5 on the right side in a vehicle-width direction and is operated to rotate by a rider. A rotation angle of the throttle grip 26 is detected by a throttle-grip opening degree sensor 27 inside a switch box 25, and then is transmitted to the ECU 40. The ECU 40 drives the throttle valve motor 30 on the basis of output signals from various sensors in addition to the rotation angle of the throttle grip 26. The rotation angle of the throttle valve 28 is detected by a throttle-valve opening degree sensor 31, and then is transmitted to the ECU 40.

Figure 3:
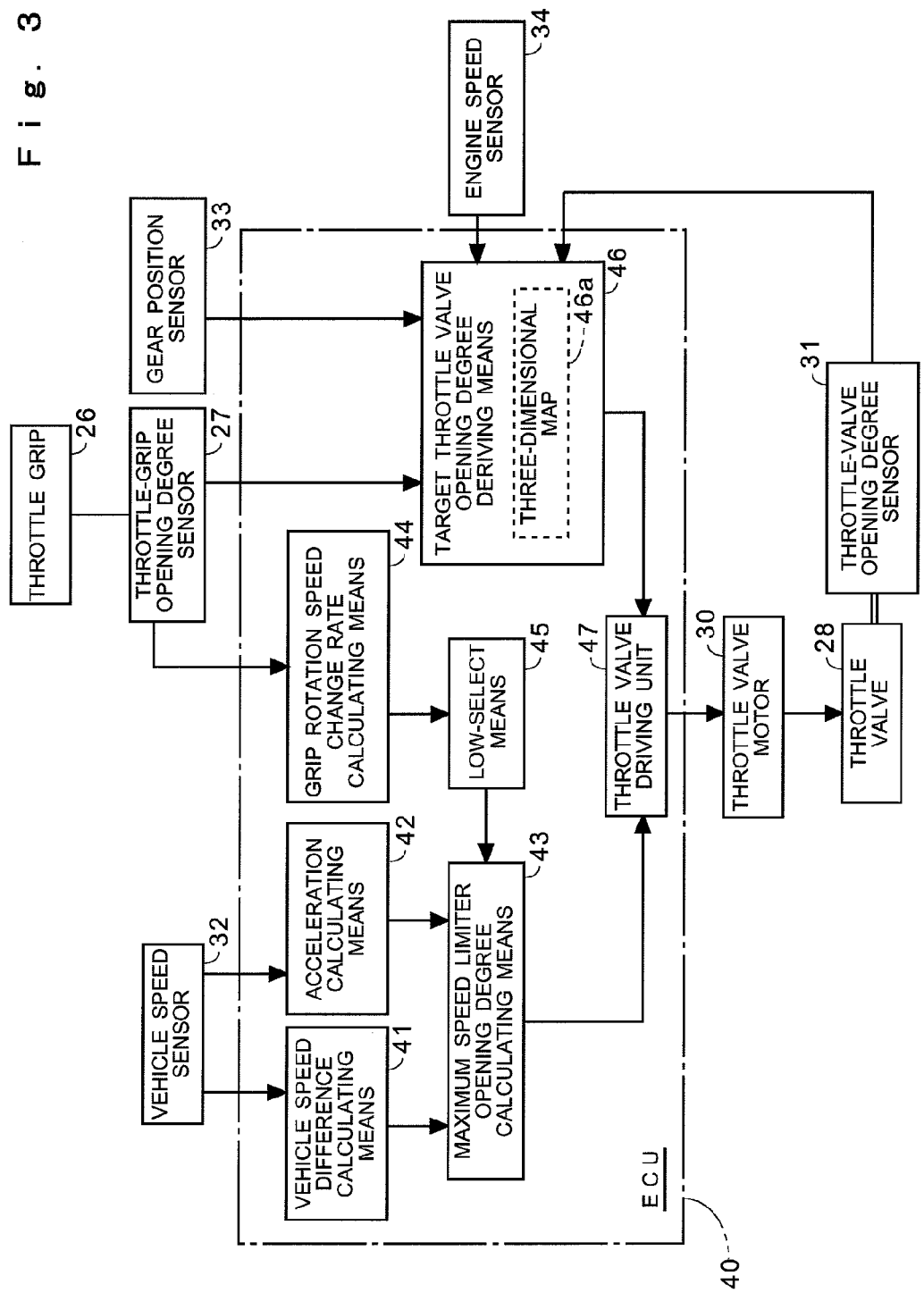
FIG. 3 is a block diagram showing a configuration of a vehicle speed limiting system and peripheral devices thereof.

FIG. 3 is a block diagram showing a configuration of a vehicle speed limiting system and peripheral devices thereof according to the embodiment. The same reference numerals as those described above indicate the same or equivalent parts. The ECU 40, which serves as the vehicle speed limiting system, includes target throttle valve opening degree deriving means 46, grip rotation speed change rate calculating means 44, low-select means 45, vehicle speed difference calculating means 41, acceleration calculating means 42, maximum speed limiter opening degree calculating means 43, and a throttle valve driving unit 47.

Figure 5:
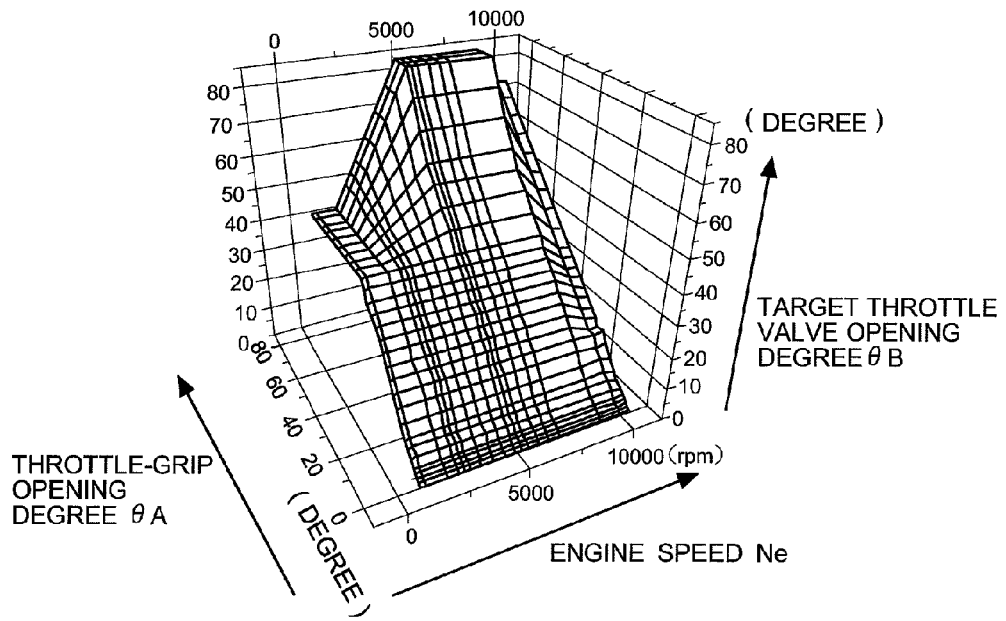
FIG. 5 is a three-dimensional map from which the target throttle valve opening is derived.

The target throttle valve opening degree deriving means 46 receives output signals respectively of the throttle-grip opening degree sensor 27, a gear position sensor 33 that detects a current gear stage of the transmission 60 (see FIG. 1), an engine speed sensor 34, and the throttle-valve opening degree sensor 31. A three-dimensional map 46a that is included in the target throttle valve opening degree deriving means 46 is used for deriving a target throttle valve opening degree θB from a throttle grip opening degree θA and an engine speed Ne, as shown in FIG. 5. In the embodiment, a corresponding number of maps to the number of gear stages of the transmission 60 are prepared (for example, 6 maps if the transmission 60 has 6 stages).

The grip rotation speed change rate calculating means 44 calculates a change rate of the rotation speed of the throttle grip 26 operated by the rider. The low-select means 45 executes a low-select process on a maximum speed limiter opening degree, which will be described later, when the change rate of the rotation speed of the throttle grip 26 exceeds a predetermined value.

The vehicle speed difference calculating means 41 calculates a speed difference ((Set Maximum Speed)−(Current Speed)) of the motorcycle 1 on the basis of the output signals of a vehicle speed sensor 32. In addition, the acceleration calculating means 42 calculates an acceleration (((Current Speed)−(Previous Speed))/(Elapsed Time)) of the motorcycle 1 on the basis of the output signals of the vehicle speed sensor 32. The maximum speed limiter opening degree calculating means 43 calculates a maximum speed limiter opening degree of the throttle valve 28 on the basis of the speed difference and the acceleration. The maximum speed limiter opening degree is calculated by adding a first predetermined opening degree, a second predetermined opening degree, and a current throttle valve opening degree. The first predetermined opening degree is calculated by multiplying the speed difference by a preset P-term coefficient, and the second predetermined opening degree is calculated by multiplying the acceleration by a preset D-term coefficient. A value calculated by the maximum speed limiter opening degree calculating means 43 is referred to as a first maximum speed limiter opening degree in the embodiment.

The throttle valve driving unit 47 then drives the throttle valve motor 30, on the basis of the target throttle valve opening degree θB derived by the target throttle valve opening degree deriving means 46, or on the basis of the first maximum speed limiter opening degree calculated by the maximum speed limiter opening degree calculating means 43.

Figure 4:
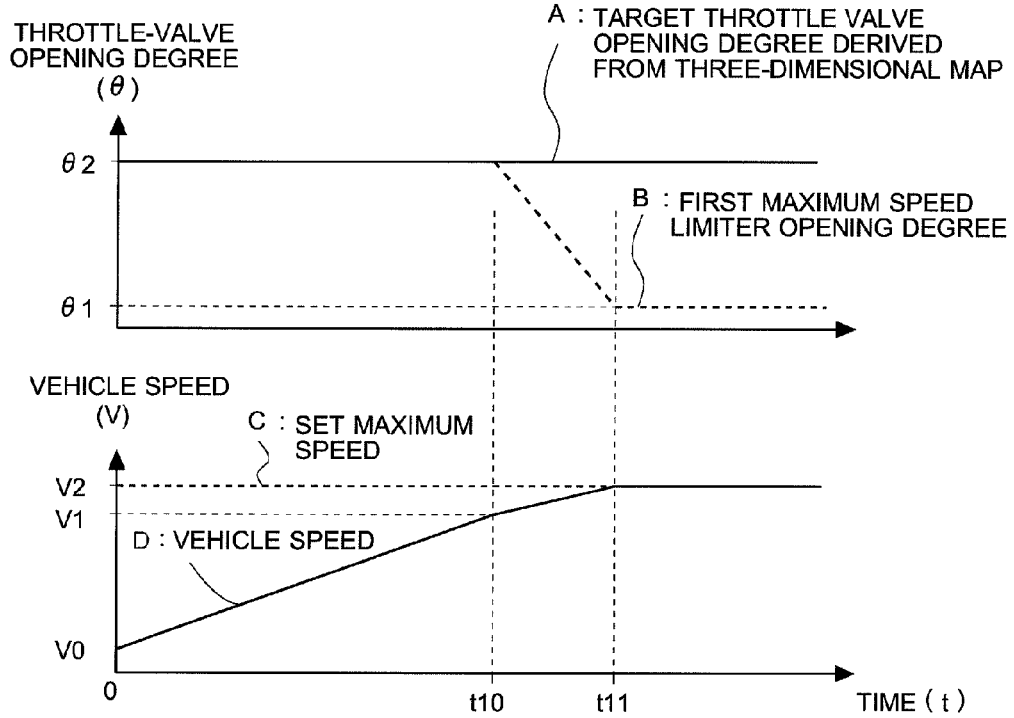
FIG. 4 is timing charts showing relationships of a target throttle valve opening degree, a maximum speed limiter opening degree, and a vehicle speed.

FIG. 4 is timing charts showing relationships of the target throttle valve opening degree θB, the first maximum speed limiter opening degree, and the vehicle speed. The timing chart on the upper side shows a relationship between the first maximum speed limiter opening degree (a dashed line B) and the target throttle valve opening degree θB (a solid line A) derived using the three-dimensional map 46a. The timing chart on the lower side shows a relationship between a predetermined set maximum speed (a dashed line C) and the vehicle speed (solid line D).

During a normal running, the throttle valve driving unit 47 drives the throttle valve motor 30 in accordance with the target throttle valve opening degree θB derived using the three-dimensional map 46a. When the speed of the motorcycle 1, continuously accelerating from a vehicle speed V0, reaches a vehicle speed V1 close to a set maximum speed V2 at a time point t10, the first maximum speed limiter opening degree falls below the target throttle valve opening degree θB. In response to this event, the throttle valve driving unit 47 switches its control to one with which to drive the throttle valve motor 30 in accordance with the first maximum speed limiter opening degree. Therefore, for example, even when the speed of the motorcycle 1 approaches the set maximum speed with the throttle grip 26 being fully opened by the operation of the rider, the throttle valve 28 is automatically driven in the closing direction in accordance with the first maximum speed limiter opening degree. As a result, a smooth maximum speed control is performed.

The embodiment is set as follows. Until the time reaches the time point t10, the target throttle valve opening degree θB derived using the three-dimensional map 46a and the first maximum speed limiter opening degree take the same value θ2. Then, the first maximum speed limiter opening degree starts linearly decreasing at the time point t10, and is converged to a value θ1 at a time point t11. Concurrently, the vehicle speed V gradually reaches the set maximum speed V2.

Figure 6:
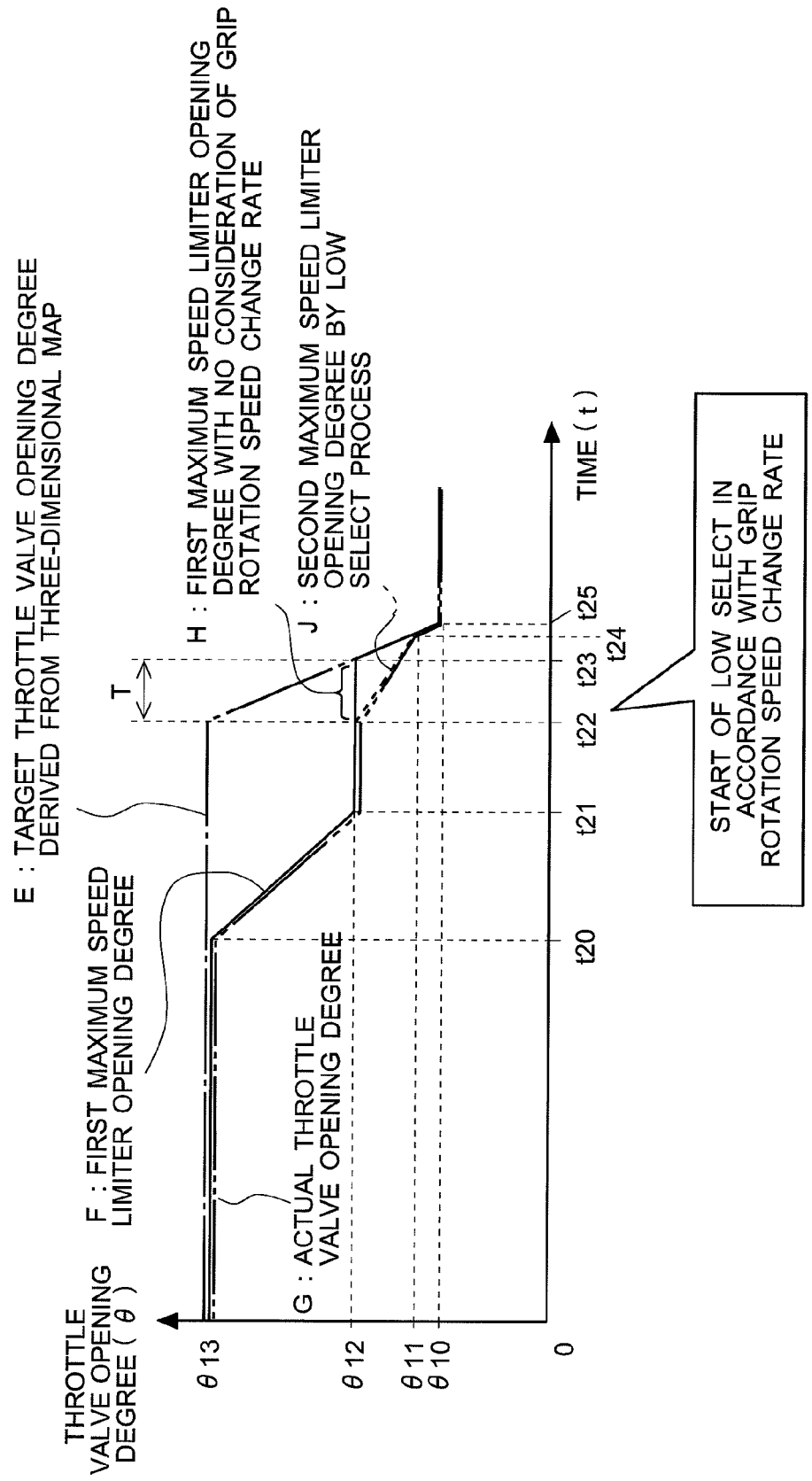
FIG. 6 is a timing chart showing a flow of a low-select process.

FIG. 6 is a timing chart showing the flow of the low-select process for transitioning from the first maximum speed limiter opening degree to a second maximum speed limiter opening degree. The timing chart shows relationships of the target throttle valve opening degree θB (an alternate long and short dash line E) derived using the three-dimensional map 46a, the first maximum speed limiter opening degree (a solid line F), an actual throttle valve opening degree (an alternate long and two short dashes line G), and the second maximum speed limiter opening degree (a dashed line J).

During the execution of the aforementioned maximum speed limiting using the first maximum speed limiter opening degree, a phenomenon described below possibly occur. For example, during the cruising at the set maximum speed with the throttle grip 26 fully opened by the operation of the rider, an actual throttle valve opening degree is at a position shifted from a fully opened position in the closing direction (for example, at an opening degree of 50%) by a drive control in accordance with the first maximum speed limiter opening degree. If an operation to rapidly return the throttle grip 26 (rotate the throttle grip 26 in the closing direction) is performed in this state, the throttle valve driving unit 47 does not drive the throttle valve 28 in the closing direction until the target throttle valve opening degree falls below the first maximum speed limiter opening degree. This operation possibly gives the rider such a discomfort that the rider does not feel deceleration although returned the throttle grip 26. Against this problem, in the embodiment, when the change rate of the rotation speed of the throttle grip 26 being returned is not less than the predetermined value, the low-select process is executed to transition from the first maximum speed limiter opening degree to the second maximum speed limiter opening degree that is smaller than the first maximum speed limiter opening degree.

Hereinafter, the low-select process will be described in detail with reference to FIG. 6. Until the time reaches a time point t20, the target throttle valve opening degree θB (the alternate long and short dash line E) derived using the three-dimensional map 46a, the first maximum speed limiter opening degree (the solid line F), and the actual throttle valve opening degree (the alternate long and two short dashes line G) take the same value θ13. Then, the first maximum speed limiter opening degree starts linearly decreasing from the time point t20, and along with this, the actual throttle valve opening degree also starts decreasing. After that, the first maximum speed limiter opening degree and the actual throttle valve opening degree are converged to an opening degree θ12 at a time point t21, so that the maximum speed limiting control is continued.

Then, consider a case where the low-select process is not executed when the throttle grip 26 is rapidly closed from the fully-opened state at a time point t22. In this case, the first maximum speed limiter opening degree is continuously used. For this reason, the actual throttle valve opening degree does not change until the target throttle valve opening degree θB derived using the three-dimensional map 46a falls below the first maximum speed limiter opening degree at a time point t23.

In this regard, in the embodiment, once the throttle grip 26 is detected to have been returned at a rotation speed not less than a predetermined value at the time point t22, the low-select process is executed to transition from the first maximum speed limiter opening degree to the second maximum speed limiter opening degree that is smaller than the first maximum speed limiter opening degree. Executing the low-select process makes it possible to immediately decrease the actual throttle valve opening degree in response to the operation of the throttle grip 26, and thus to achieve a throttle valve control consistent with the throttle operation. Note that, in the illustrated example, the target throttle valve opening degree θB derived using the three-dimensional map 46a falls below the second maximum speed limiter opening degree at a time point t24. Accordingly, the throttle valve control returns again to the control based on the target throttle valve opening degree θB, so that the second maximum speed limiter opening degree and the actual throttle valve opening degree are converged to an opening degree θ10 at a time point t25.

As described above, the vehicle speed limiting system according to the present invention provides the following effects. The first maximum speed limiter opening degree is calculated by adding the first predetermined opening degree calculated by multiplying the speed difference by the preset P-term coefficient, the second predetermined opening degree calculated by multiplying the acceleration by the preset D-term coefficient, and the current throttle valve opening degree. When the first maximum speed limiter opening degree falls below the target throttle valve opening degree derived from the three-dimensional map on the basis of the throttle grip opening degree and the engine speed, the throttle valve is driven on the basis of the first maximum speed limiter opening degree. Accordingly, the setting of the throttle valve opening degree in accordance with the difference between the current vehicle speed and the maximum speed as well as with the acceleration of the vehicle makes it possible to smooth the speed change of the vehicle from a state where the speed has approached the maximum speed to a state where the speed reaches the maximum speed.

It should be note that, the configuration of the throttle-by-wire mechanism, the internal configuration of the ECU, the shape of the target throttle valve opening degree map, the set values of the P-term coefficient and the D-term coefficient used for calculating the maximum speed limiter opening degree, the difference between the first maximum speed limiter opening degree and the second maximum speed limiter opening degree, and the like are not limited to those in the above-described embodiment, and may be modified in various manners. For example, a configuration is possible where a set maximum speed for calculating the maximum speed limiter opening degree is provided for each certain opening degree of the throttle grip. With this configuration, when the throttle grip is returned during the maximum speed limiting control, the throttle valve can be driven in the closing direction immediately in response to the return. The vehicle speed limiting system according to the present invention may be employed in not only motorcycles but also various other types of vehicles, such as three-wheel vehicles and four-wheel vehicles.

Figure 7:
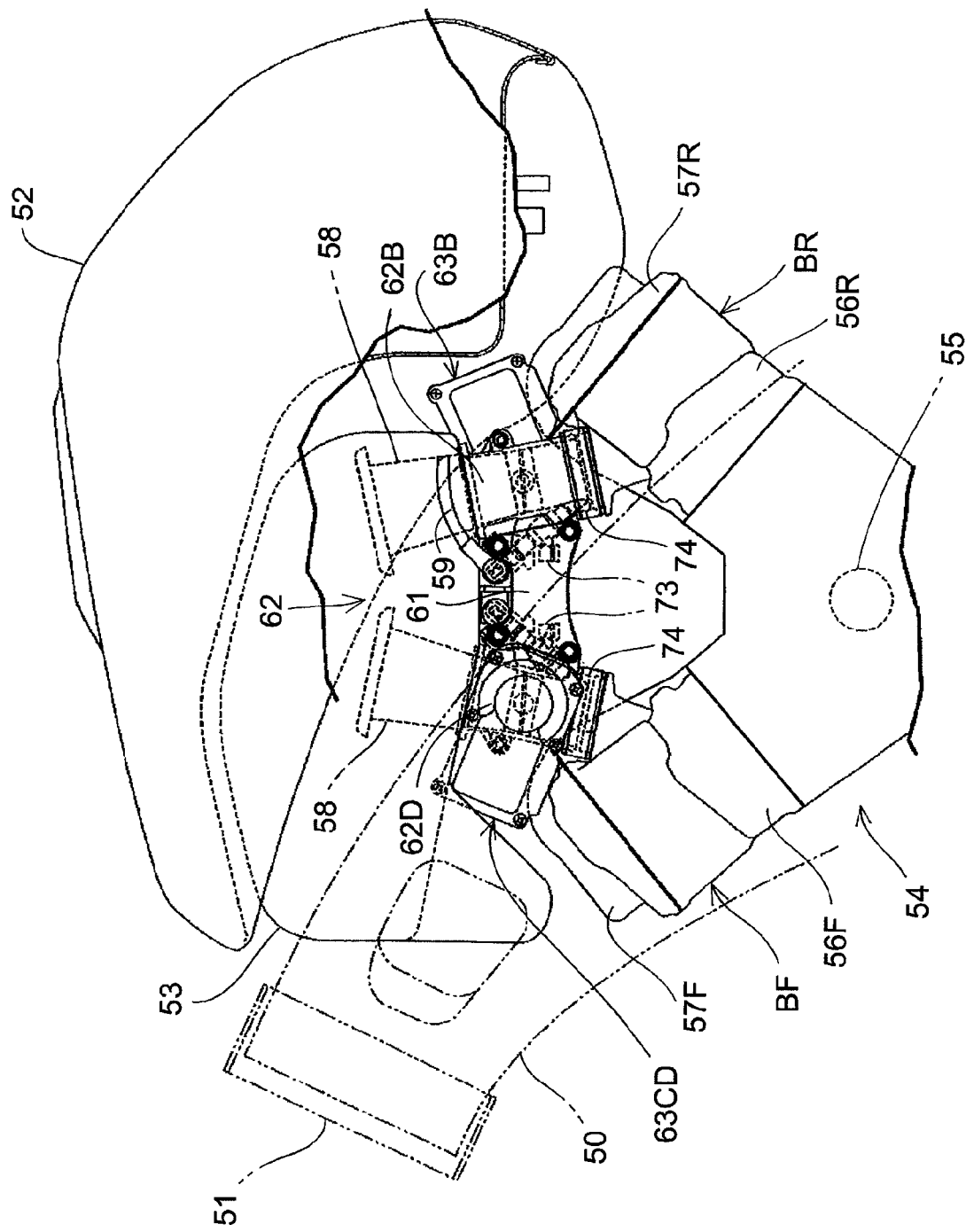
FIG. 7 is a side view of an engine to which a vehicle speed limiting system according to a second embodiment of the present invention is applied.
Figure 8:
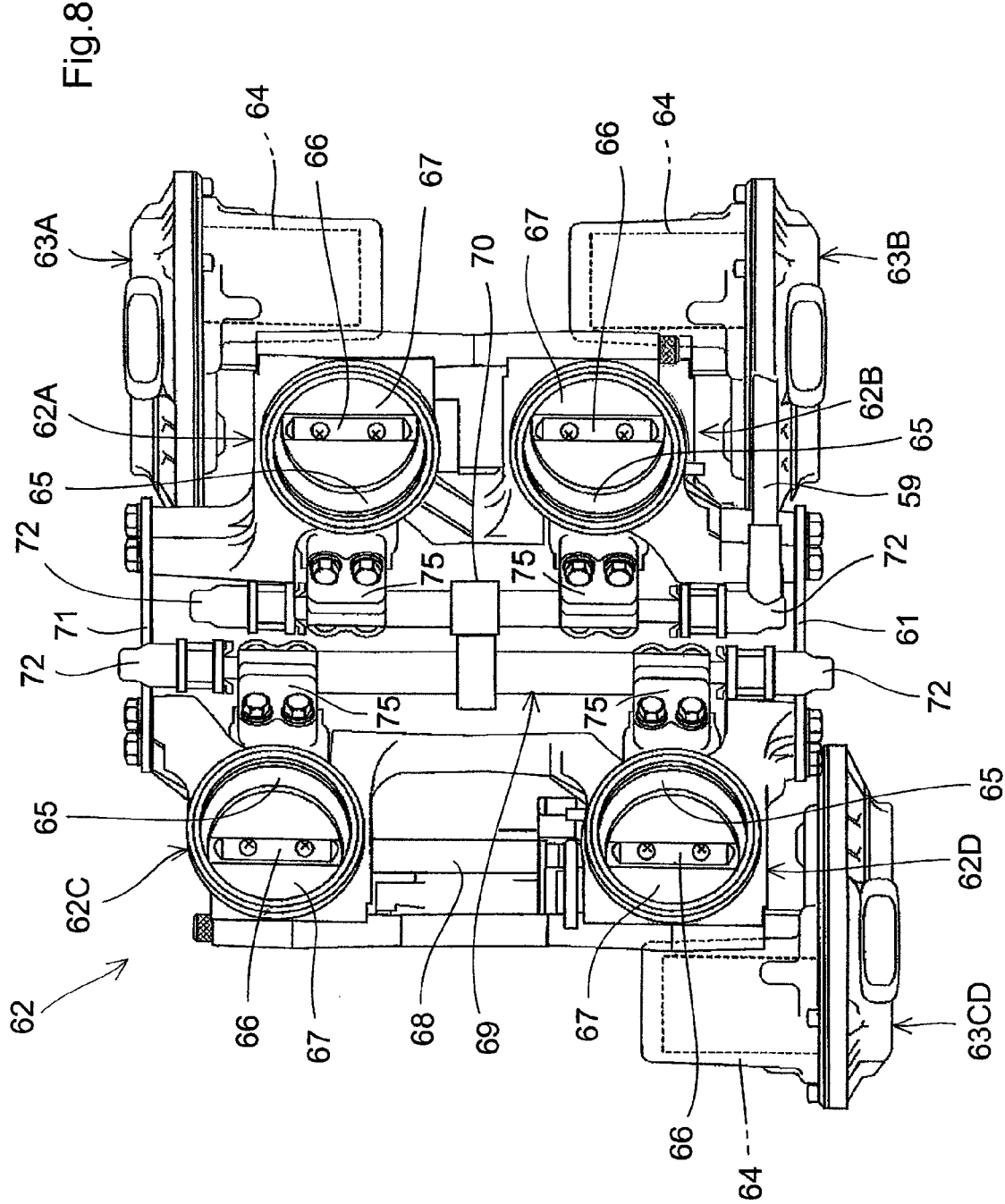
FIG. 8 is a top view of a throttle body.

FIG. 7 is a side view of an engine 54 to which a vehicle speed limiting system according to a second embodiment of the present invention is applied. FIG. 8 is a top view of a throttle body 62 attached to the engine 54. The engine 54 is attached to a vehicle body frame 50 similar to that of the motorcycle 1. A head pipe 51 is coupled to the front end portion of the vehicle body frame 50.

The engine 54 has a crankshaft 55 arranged in a vehicle-width direction, and is a four-cylinder V-type engine with two cylinders in a front side bank BF and two cylinders in a rear side bank BR. A front side cylinder head 57F is attached to the upper portion of a front side cylinder block 56F, and a rear side cylinder head 57R is attached to the upper portion of a rear side cylinder block 56R. The throttle body 62 is arranged as an intake device between the front side bank BF and the rear side bank BR.

The throttle body 62 is connected to the intake port of each cylinder through four insulators 74. An air funnel 58 is attached to the upper portion of the throttle body 62, and an air cleaner box 53 is arranged to cover the air funnel 58. A fuel tank 52 is arranged on the upper portion of the air cleaner box 53. For each of the cylinders, an injector 73 of a fuel injection system is attached to the throttle body 62, and fuel within the fuel tank 52 is fed under pressure through a fuel hose 59 to the injector 73.

The throttle body 62 is composed of a first cylinder body 62A, a second cylinder body 62B, a third cylinder body 62C and a fourth cylinder body 62D, and the two cylinder bodies on the side of the front side bank BF and the two cylinder bodies on the side of the rear side bank BR are linked to each other by side plates 61, 71. Within the bore 65 of each of the bodies, a disc-shaped throttle valve 64 attached to a rotational shaft 66 is arranged, respectively. The fuel fed under pressure from the fuel hose 59 is supplied to the injector 73 of each cylinder through a front side supply tube 69 and a rear side supply tube 70 that are fixed by a fastening member 75. A stopper 72 is attached to each of the both end portions of the front side supply tube 69 and the rear side supply tube 70.

The engine 54 has a cylinder stop feature for stopping at least one of the four cylinders while the motorcycle 1 is running, in the present embodiment, the number of cylinders being operated can be switched arbitrarily from two to three and to four. When the cylinder is stopped, the throttle valve 64 of the cylinder to be stopped is closed into an idle opening degree. In the present embodiment, a throttle valve opening degree for achieving a predetermined number of idling revolutions when all the cylinders are operated is defined as the idle opening degree. In order to achieve the cylinder stop function described above, the throttle body 62 has three motor units 63A, 63B and 63CD. Each of the motor units includes a motor portion 63 and a speed reduction mechanism (not shown).

The motor unit 63A drives the throttle valve 67 of the first cylinder body 62A, and the motor unit 63B drives the throttle valve 67 of the second cylinder body 62B. On the other hand, the throttle valve 67 of the third cylinder body 62C and the throttle valve 67 of the fourth cylinder body 62D are linked to each other by a link shaft 68, and both of these valves are driven by one motor unit 63CD.

With the configuration described above, it is possible to arbitrarily switch between a four cylinder operation state in which three motors are similarly driven, a three cylinder operation state (the first cylinder and the second cylinder are stopped) in which two motors are similarly driven and a two cylinder operation state (the first cylinder and the second cylinder are stopped) in which one motor is driven. Note that, various modifications of the operation of each motor unit while the engine is being operated are possible, and for example, it is also possible to perform control so that the throttle valve opening degree is different for each of the cylinders.

Note that, a common engine has a characteristic in which it is easy to obtain a satisfactory combustion state when its throttle valve opening degree is somewhat large as compared with a case where the throttle valve opening degree is small. Especially in a vehicle having a sufficient engine output, for example, even when running on a highway, a necessary throttle valve opening degree may be, for example, approximately 10%. On the other hand, when part of the cylinders is stopped in the same running state, the necessary throttle valve opening degree in the cylinders being operated is increased (for example, 50% per cylinder) and the combustion state is enhanced, with the result that the fuel efficiency can be enhanced.

Figure 9:
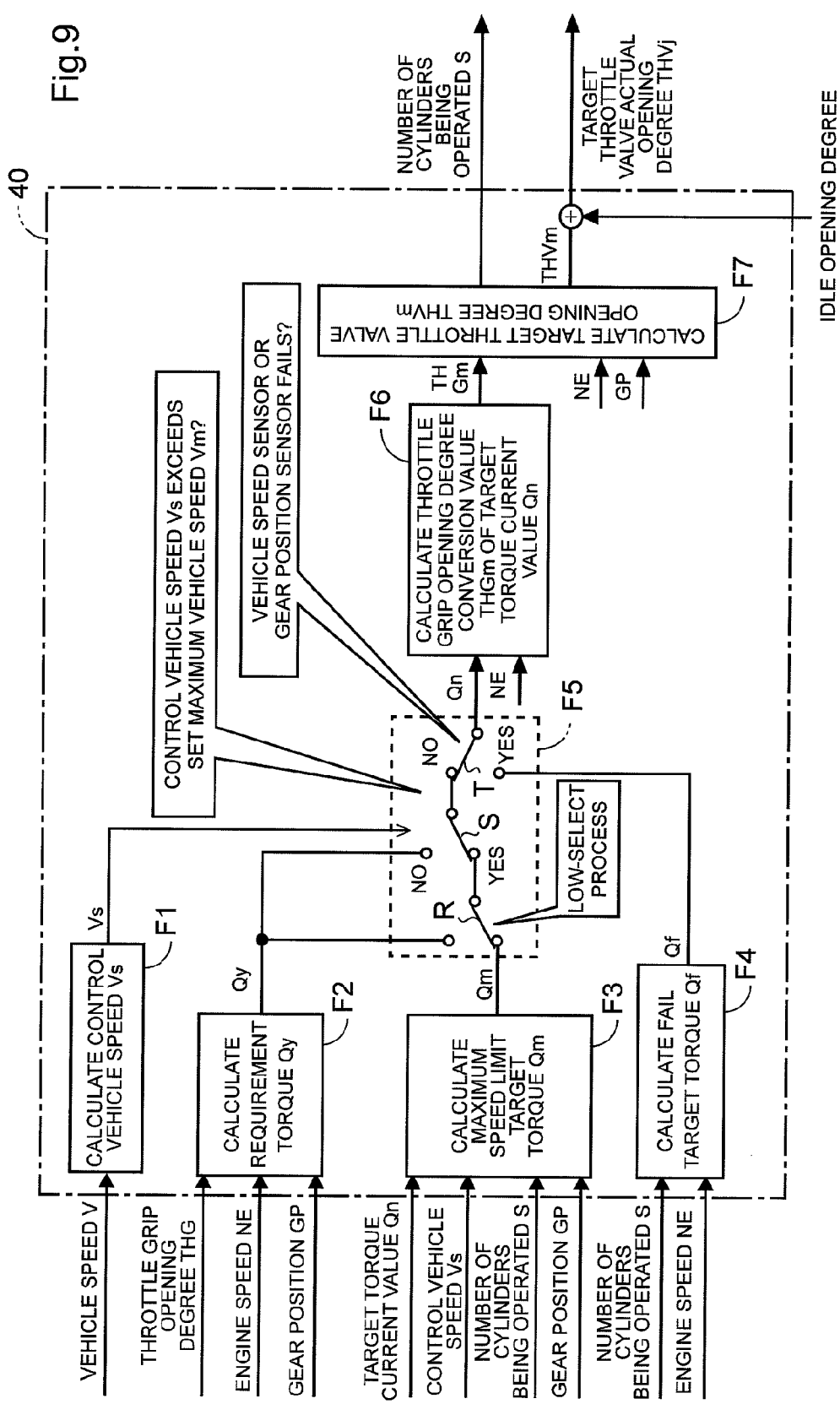
FIG. 9 is a block diagram showing the flow of control by the vehicle speed limiting system according to the second embodiment of the present invention.

FIG. 9 is a block diagram showing the flow of control by the vehicle speed limiting system according to the second embodiment of the present invention. The present embodiment is characterized in that, in a vehicle including an engine having the cylinder stop mechanism, a target throttle valve opening degree is set in accordance with the number of cylinders being operated when the current vehicle speed reaches a preset set maximum vehicle speed, and the motor unit is driven and controlled using the target throttle valve opening degree, and thus it is possible to limit the maximum speed in accordance with the number of cylinders being operated.

In step F1, based on an output value of a vehicle speed sensor 32 (see FIG. 3), a control vehicle speed Vs is calculated as the current vehicle speed. This control vehicle speed Vs is obtained by performing an "averaging operation" on the output value of the vehicle speed sensor 32 used to control an ignition device and the fuel injection system, and the control vehicle speed Vs is obtained by a calculation formula "control vehicle speed Vs={(vehicle speed sensor output value+previous operation value of control vehicle speed Vs)/2×averaging coefficient+previous operation value of control vehicle speed Vs×(1−averaging coefficient)}."

In step F2, a requirement torque Qy is calculated as an engine torque that is assumed to be currently output, using a preset three-dimensional map having parameters that are a throttle grip opening degree THG detected by a throttle-grip opening degree sensor 27, the engine speed NE detected by an engine speed sensor 34 and a gear position GP detected by a gear position sensor 33.

The three-dimensional map for calculating the requirement torque Qy has requirement torque data that prevents the control vehicle speed Vs from exceeding the set maximum vehicle speed Vm, in a predetermined throttle grip opening degree region and a predetermined engine speed region in which the control vehicle speed Vs exceeds the set maximum vehicle speed Vm. Thus, during a normal running, the vehicle speed limiting system 40 drives the throttle valve 64 in accordance with the requirement torque Qy calculated in the three-dimensional map, and thereby performs control so that the control vehicle speed Vs does not exceed the set maximum vehicle speed Vm.

In step F3, the maximum speed limit target torque Qm is calculated based on each of a target torque current value Qn, the control vehicle speed Vs, the number of cylinders being operated S and the gear position GP. The maximum speed limit target torque Qm reflects feedback control using the target torque current value Qn.

The maximum speed limit target torque Qm is calculated by adding the target torque current value Qn that is converted into a target throttle grip opening degree THGm, described later, at the time of the previous process to a feedback operation amount FB. The feedback operation amount FB is calculated based on a difference (P term) between the set maximum vehicle speed Vm and the control vehicle speed Vs and an amount of variation in the difference (D term).

Specifically, a vehicle speed difference (P term) is first calculated by an operation formula (set maximum vehicle speed Vm−control vehicle speed Vs). Next, the amount of variation in the vehicle speed difference is calculated by an operation formula (current vehicle speed difference $P_n$−previous vehicle speed difference $P_{n-1}$). Subsequently, a P-term coefficient and a D-term coefficient are switched according to whether the control vehicle speed Vs is larger or smaller than the set maximum vehicle speed Vm. Then, the feedback operation amount FB is calculated by an operation formula (P-term coefficient Kp×P term−D-term coefficient Kd×D term). Finally, the maximum speed limit target torque Qm is calculated by an operation formula (target torque current value Qn+feedback operation amount FB). In this operation formula, the target torque current value Qn is assumed to be a value that is converted into the target throttle grip opening degree THGm at the time of the previous operation process.

In step F4, based on the number of cylinders being operated S and the engine speed NE, a fail target torque Qf is calculated from a preset map. This fail target torque Qf is used when the vehicle speed sensor 32 and the gear position sensor 33 fail such as by being disconnected. The fail target torque Qf is used because the feedback operation amount FB cannot be calculated, and the fail target torque Qf is calculated as the lowest value that can be acquired in accordance with the side of a high gear so that a load is not placed on each portion of the engine or the like.

In a determination R in step F5, low-select process for selecting which one of the requirement torque Qy and the maximum speed limit target torque Qm is smaller is executed. Although, normally, the throttle valve is driven in accordance with the requirement torque Qy calculated from the three-dimensional map and thus the maximum speed is limited, when the engine is throttled and thus the engine output is increased or a road surface is downhill, the maximum speed limit target torque Qm obtained by performing feedback control on the throttle value opening degree resulting from conversion of the requirement torque is smaller than the requirement torque Qy calculated from the three-dimensional map. Therefore, here, the low-select process is executed to set the maximum speed limit target torque Qm at a new target torque current value, and the corresponding throttle valve opening degree is applied, and thus it is possible to accurately limit the maximum speed. Note that, factors for causing the vehicle speed to exceed the set maximum vehicle speed Vm even when the throttle valve is driven in accordance with the requirement torque Qy calculated from the three-dimensional map probably include the tolerance of each component of the engine, whether a pre-conditioning interim operation is performed, the degradation of the engine, variations in the characteristics of sensors including aged deterioration and wearing of tires.

Next, in a determination S in step F5, whether the control vehicle speed Vs exceeds the set maximum vehicle speed Vm is determined. Here, if the control vehicle speed Vs is determined to exceed the set maximum vehicle speed Vm, the requirement torque Qy is switched to the maximum speed limit target torque Qm. In a determination T in step F5, whether the vehicle speed sensor 32 or the gear position sensor 33 fails is determined. If it fails, the fail target torque Qf is selected.

When step F5 has been performed, any one of the requirement torque Qy and the maximum speed limit target torque Qm is set at a new target torque current value Qn. This new target torque current value Qn is used when the maximum speed limit target torque Qm is calculated the next time. Then, in step F6, based on the new target torque current value Qn and the engine speed NE, the throttle grip opening degree conversion value THGm of the target torque current value Qn is calculated. This conversion process is executed using a map or the like that is preset based on the design value and the like of the vehicle. Further, the vehicle speed limiting system according to the present embodiment has a map specifying a correspondence relationship between the throttle grip opening degree conversion value THGm and the number of cylinders being operated S, and when step F5 has been performed, the number of cylinders being operated S is also derived.

Then, in step F7, based on the throttle grip opening degree conversion value THGm, the engine speed NE and the gear position GP, a target throttle valve opening degree THVm is calculated. This conversion process is also executed using a map or the like that is set based on the design value and the like of the vehicle.

Then, when the target throttle valve opening degree THVm is calculated, process for allocating a target throttle valve actual opening degree THVj to each of the cylinders is executed in accordance with the number of cylinders being operated S. This is because, preferably, since, in an engine that makes the state of the operation of a plurality of cylinders variable, the state of the operation is switched by the engine speed and the state of the throttle grip opening degree, the target torque in accordance with the opening degree of the throttle grip operated by a driver is temporarily converted into the target throttle opening degree of the throttle grip, the value of the target throttle grip opening degree is used to determine the number of cylinders being operated, and the target value of the throttle valve opening degree of the cylinders being operated is set to perform the allocation. The target throttle valve actual opening degree THVj is calculated by adding the idle opening degree described above to the target throttle valve opening degree THVm. Hereinafter, the procedure for the target torque calculation process will be recognized again with reference to FIGS. 10 to 13.

Figure 10:
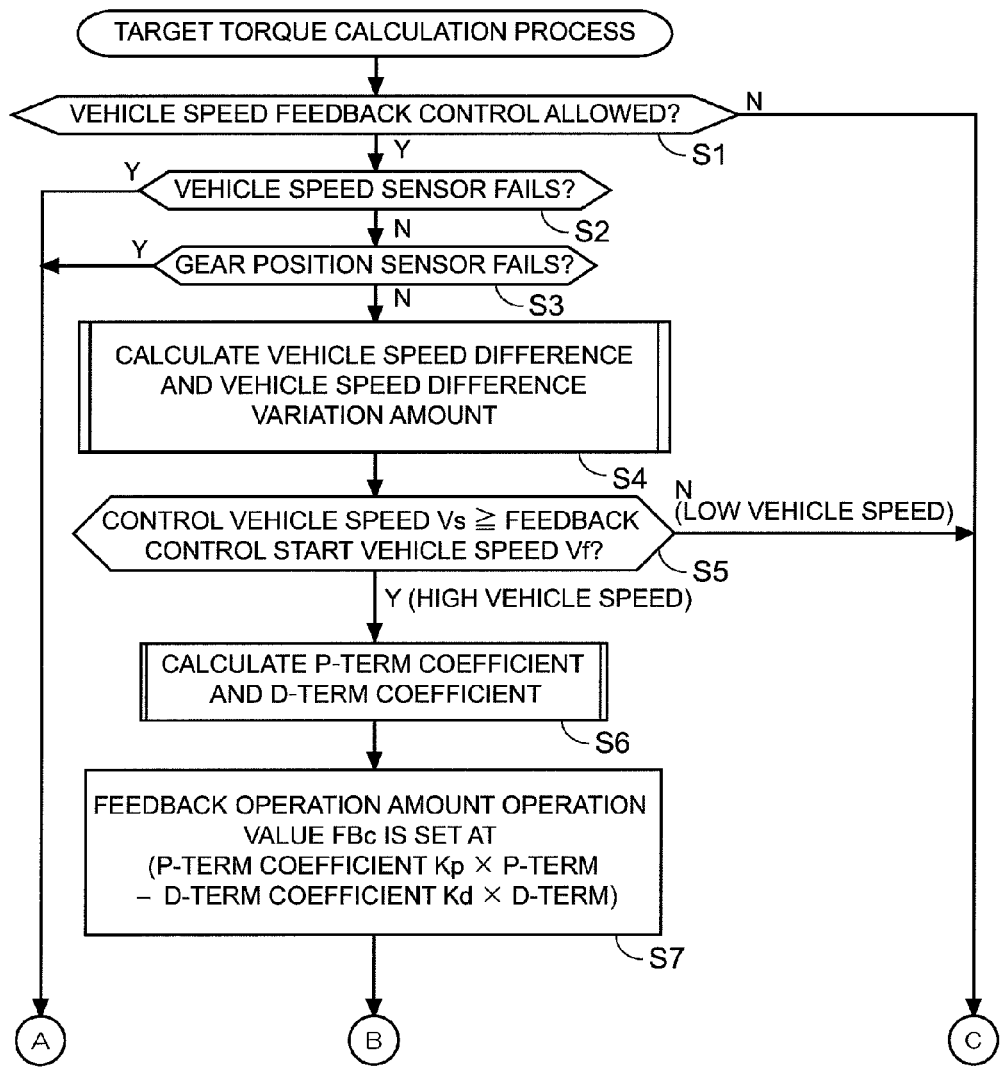
FIG. 10 is flowchart showing the procedure for the target torque calculation process (first half part).
Figure 11:
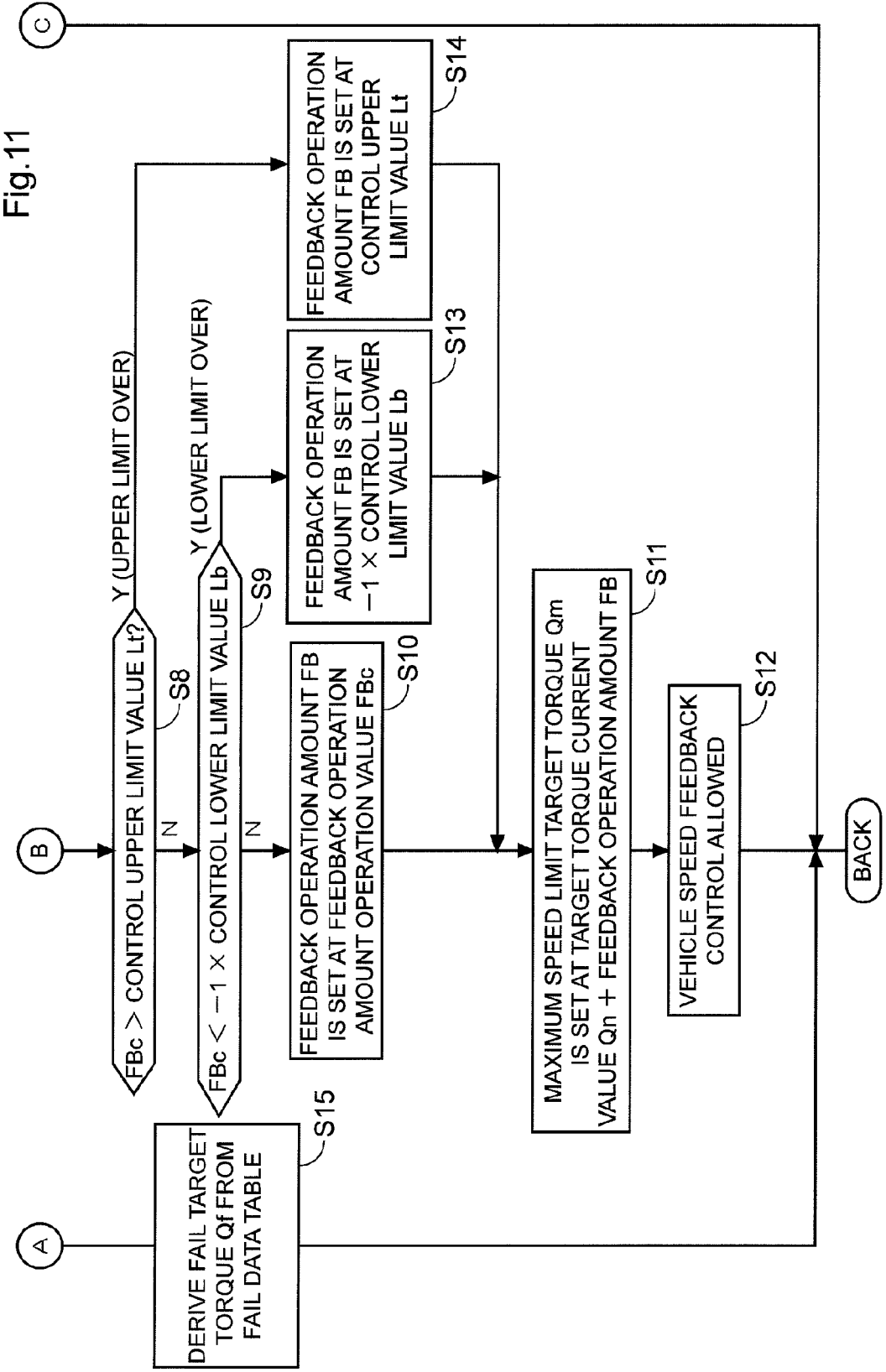
FIG. 11 are flowcharts showing the procedure for the target torque calculation process (second half part).

FIG. 10 and FIG. 11 are flowcharts showing the procedure for the target torque calculation process. In step S1, whether vehicle speed feedback control is allowed is determined, and, if the positive determination is made, the process proceeds to step S2. In step S2, whether the vehicle speed sensor 32 fails such as by being disconnected is determined, and, if the negative determination is made, the process proceeds to step S3.

In step S3, whether the gear position sensor 33 fails such as by being disconnected is determined, and, if the negative determination is made, the process proceeds to step S4 where a calculation process is executed for the vehicle speed difference and the amount of variation in the vehicle speed difference. If, in step S1, the negative determination is made, the process proceeds to C, and if, in step S2 and step S3, the positive determination is made, the process proceeds to A. Here, reference to FIG. 12 is made.

Figure 12:
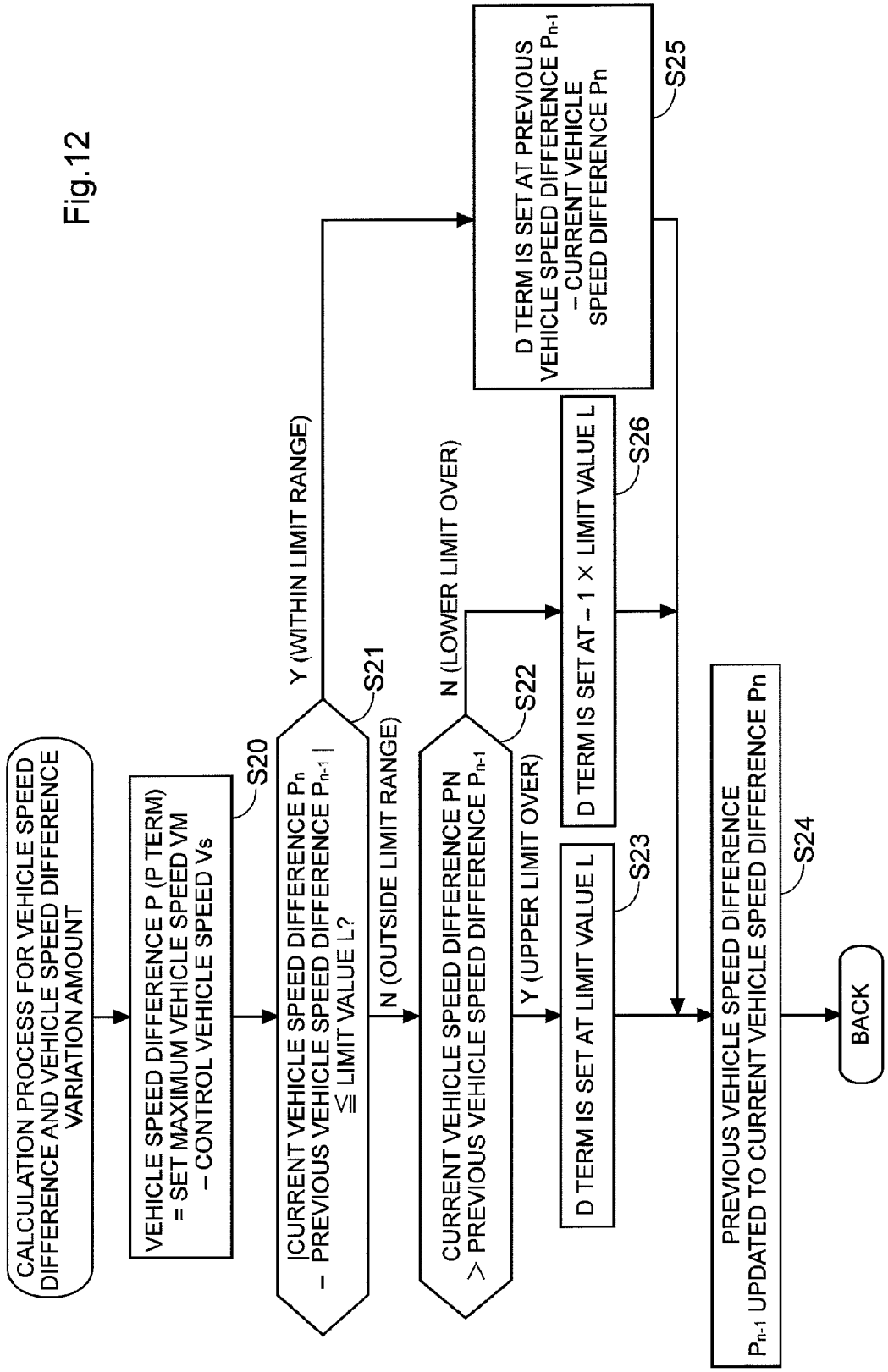
FIG. 12 is a sub-flow showing the procedure for the calculation process of the vehicle speed difference and the amount of variation in the vehicle speed difference.

FIG. 12 is a sub-flow showing the procedure for the calculation process of the vehicle speed difference and the amount of variation in the vehicle speed difference. In step S20, the vehicle speed difference P (P term) is calculated by the operation formula (set maximum vehicle speed Vm−control vehicle speed Vs). Subsequently, in step S21, whether the value of | current vehicle speed difference $P_n$−previous vehicle speed difference $P_{n-1}$|, that is, the value of D term is equal to or less than a limit value L is determined. If, in step S21, the negative determination is made, that is, the value of D term is determined to fall outside the limit range, the process proceeds to step S22 where whether the current vehicle speed difference $P_n$ is larger than the previous vehicle speed difference $P_{n-1}$ is determined.

If, in step S22, the positive determination is made, that is, it is determined that the current vehicle speed difference $P_n$ becomes larger than the previous vehicle speed difference $P_{n-1}$, and it exceeds the upper limit, the process proceeds to step S23 where the value of D term is set at the limit value. On the other hand, if, in step S22, the negative determination is made, that is, it is determined that the current vehicle speed difference $P_n$ becomes smaller than the previous vehicle speed difference $P_{n-1}$, and it exceeds the lower limit, the process proceeds to step S26 where the value of D term is set at −1×limit value L.

Then, if, in step S21, the positive determination is made, that is, the value of D term is determined to fall within the limit range, the process proceeds to step S25 where the value of D term is set at (previous vehicle speed difference $P_{n-1}$−current vehicle speed difference $P_n$). Then, in step S24, the previous vehicle speed difference $P_{n-1}$ is updated to the current vehicle speed difference $P_n$, and the process returns to the main flow of FIG. 10.

In step S5 of FIG. 10, whether the control vehicle speed Vs is equal to or more than a feedback control start vehicle speed Vf is determined. Here, the feedback control start vehicle speed Vf is set lower than the set maximum vehicle speed Vm. If, in step S5, the positive determination is made, that is, the vehicle speed is determined to be a high vehicle speed, the process proceeds to step S6 where a calculation process is executed for the P-term coefficient and the D-term coefficient. Here, reference to FIG. 13 is made.

Figure 13:
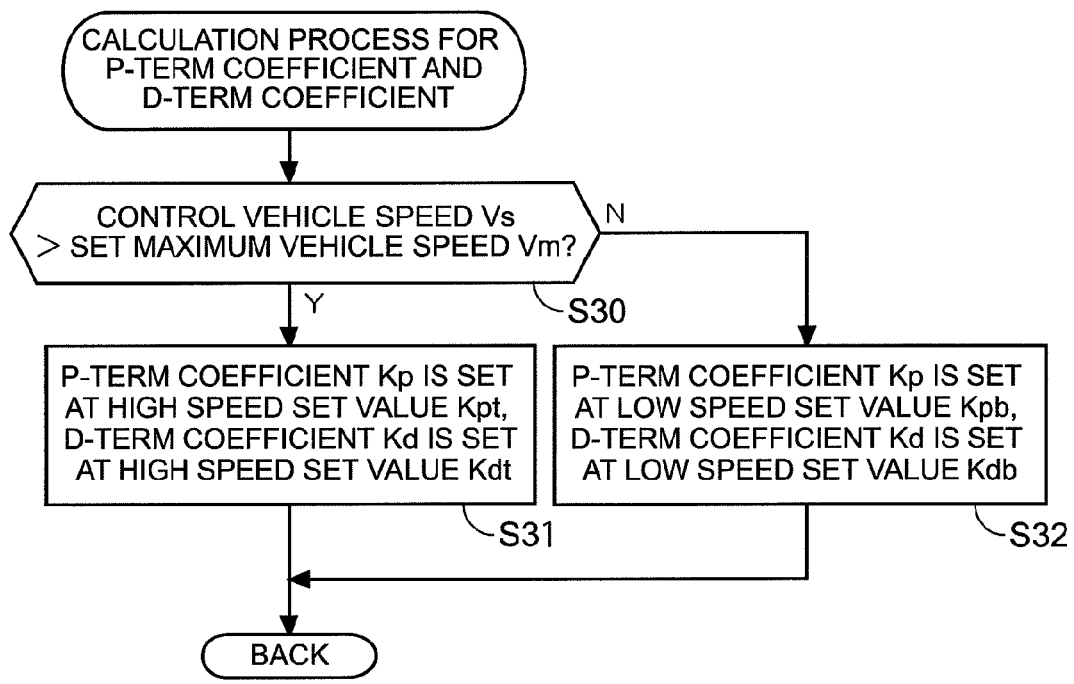
FIG. 13 is a sub-flow showing the procedure for the calculation process of the P-term coefficient and the D-term coefficient.

FIG. 13 is a sub-flow showing the procedure for the calculation process of the P-term coefficient and the D-term coefficient. In step S30, whether the control vehicle speed Vs exceeds the set maximum vehicle speed Vm is determined. If, in step S30, the positive determination is made, the process proceeds to step S31 where the P-term coefficient Kp is set at a high speed set value Kpt and the D-term coefficient Kd is set at a high speed set value Kdt, and the process returns to the main flow of FIG. 10. On the other hand, if, in step S30, the negative determination is made, the process proceeds to step S32 where the P-term coefficient Kp is set at a low speed set value Kpb and the D-term coefficient Kd is set at a low speed set value Kdb, and the process returns to the main flow of FIG. 10.

In step S7 of FIG. 10, a feedback operation amount operation value FBc is set at (P-term coefficient Kp×P term−D-term coefficient Kd×D term), and the process proceeds to B.

With reference to FIG. 11, in step S8 subsequent to B, whether the feedback operation amount operation value FBc exceeds a control upper limit value Lht is determined, and, if the negative determination is made, the process proceeds to step S9. In step S9, whether the feedback operation amount operation value FBc is lower than (1−control lower limit value Lb) is determined, and, if the negative determination is made, the process proceeds to step S10.

In step S10, the feedback operation amount FB is set at the feedback operation amount operation value FBc. On the other hand, if, in step S9, the positive determination is made, the feedback operation amount operation value FBc is determined to exceed the lower limit, and the process proceeds to step S13 where the feedback operation amount FB is set at (−1×control lower limit value Lb). If, in step S8, the positive determination is made, the process proceeds to step S14 where the feedback operation amount FB is set at the control upper limit value Lt.

Then, in step S11, the maximum speed limit target torque Qm is set at (target torque current value Qn+feedback operation amount FB), and, in step S12, the vehicle speed feedback control is allowed, with the result that a series of control is completed. On the other hand, subsequent to A of FIG. 10, in step S15, the maximum speed limit target torque Qm is derived using a fail data table, with the result that a sequence of controls is completed. Subsequent to C of FIG. 10, the vehicle speed feedback control is determined not to be allowed, and the control is completed without being processed.

As described above, in the vehicle speed limiting system according to the second embodiment of the present invention, since the target throttle valve opening degree is set in accordance with the number of cylinders being operated when the current vehicle speed of the vehicle reaches the preset set maximum vehicle speed, and the target throttle valve opening degree is used to control a plurality of motors for driving the throttle valve, it is possible to set the target throttle valve opening degree in accordance with the number of cylinders being operated to limit the maximum speed of the vehicle in the engine that has the cylinder stop function for changing the number of cylinders being operated.

Since the requirement torque of the engine is calculated using the three-dimensional map having parameters that are the throttle grip opening degree, the engine speed and the gear position sensor, and the target torque current value used for limiting the maximum speed is determined by the low-select process for selecting the smaller one of the requirement torque and the maximum speed limit target torque, even if the vehicle speed is about to exceed the set maximum vehicle speed under control using the three-dimensional map for calculating the requirement torque, it is possible to limit the maximum speed using the maximum speed limit target torque smaller than the requirement torque.

Note that, the following are not limited to those described in the above embodiments, and various modifications are possible: the type of engine and the shape and structure of the throttle body, and the form of the three-dimensional map for calculating the requirement torque, set values for the set maximum vehicle speed Vm and the feedback control start vehicle speed, the annealing operation for the control vehicle speed Vs, the operation for the maximum speed limit target torque Qm, the operation method of the P-term coefficient and the D-term coefficient, the method of converting the target torque current value into the throttle grip opening degree, the method of converting the converted throttle grip opening degree into the target throttle valve opening degree, and the like. For example, the above-described vehicle speed limiting system can be applied to a cylinder stop engine having operation/stop mechanism for a suction-discharge valve and the type of engine that stops discharge into a stopped cylinder or stops both ignition and discharge.

REFERENCE SIGNS LIST

1 ... MOTORCYCLE (VEHICLE),
26 ... THROTTLE GRIP,
27 ... THROTTLE-GRIP OPENING DEGREE SENSOR,
28 ... THROTTLE VALVE,
30 ... THROTTLE VALVE MOTOR,
31 ... THROTTLE-VALVE OPENING DEGREE SENSOR,
32 ... VEHICLE SPEED SENSOR,
33 ... GEAR POSITION SENSOR,
40 ... ECU (VEHICLE SPEED LIMITING SYSTEM),
41 ... SPEED DIFFERENCE CALCULATING MEANS,
42 ... ACCELERATION CALCULATING MEANS,
43 ... MAXIMUM SPEED LIMITER OPENING DEGREE CALCULATING MEANS,
44 ... GRIP ROTATION SPEED CHANGE RATE CALCULATING MEANS,
45 ... LOW-SELECT MEANS,
46 ... TARGET THROTTLE VALVE OPENING DEGREE DERIVING MEANS,
46A ... THREE-DIMENSIONAL MAP,
47 ... THROTTLE VALVE DRIVING UNIT,
60 ... TRANSMISSION,
62 ... THROTTLE BODY,
62A ... FIRST CYLINDER BODY,
62B ... SECOND CYLINDER BODY,
62C ... THIRD CYLINDER BODY,
62D ... FOURTH CYLINDER BODY,
63A, 63B, 63CD ... MOTOR,
VS ... CURRENT VEHICLE SPEED,
VM ... SET MAXIMUM VEHICLE SPEED,
QY ... REQUIREMENT TORQUE,
QM ... MAXIMUM SPEED LIMIT TARGET TORQUE,
S ... A NUMBER OF CYLINDERS BEING OPERATED,
THVM ... TARGET THROTTLE VALVE OPENING DEGREE,
THVJ ... THROTTLE VALVE ACTUAL OPENING DEGREE,
THGM ... TARGET THROTTLE VALVE OPENING DEGREE,
P ... VEHICLE SPEED DIFFERENCE,
D ... AMOUNT OF VARIATION IN VEHICLE SPEED DIFFERENCE,
KP ... P-TERM COEFFICIENT,
KD ... D-TERM COEFFICIENT,
FB ... FEEDBACK OPERATION AMOUNT,
FBC ... FEEDBACK OPERATION AMOUNT OPERATION VALUE

The invention claimed is:

1. A vehicle speed limiting system (40) having a throttle-by-wire mechanism that drives a throttle valve (28) using a motor (30),
the vehicle speed limiting system comprising:
a three-dimensional map (46a) that is provided to each of gear stages of a transmission (60) and from which to derive a target throttle valve opening degree (θB) of the throttle valve (28) on a basis of a throttle grip opening degree (θA) and an engine speed;
a throttle valve driving unit (47) that drives the motor (30) in accordance with the target throttle valve opening degree,
wherein, when a speed of a vehicle (1) is about to exceed a preset maximum speed, the throttle valve driving unit (47) drives the motor (30) in such a manner that the speed of the vehicle (1) does not exceed the preset maximum speed, irrespective of the target throttle valve opening degree (θB) derived from the three-dimensional map (46a), speed difference calculating means for calculating a difference between a current speed of the vehicle (1) and the preset maximum speed;
acceleration calculating means for calculating an acceleration of the vehicle (1); and
maximum speed limiter opening degree calculating means (43) for calculating a first maximum speed limiter opening degree by adding a first predetermined opening degree, a second predetermined opening degree, and a current throttle valve opening degree, the first predetermined opening degree being calculated by multiplying the speed difference by a preset P-term coefficient, the second predetermined opening degree being calculated by multiplying the acceleration by a preset D-term coefficient,
wherein the throttle valve driving unit (47) is configured to drive the motor (30) on a basis of the first maximum speed limiter opening degree once the calculated first maximum speed limiter opening degree falls below the target throttle valve opening degree (θB) derived on a basis of the three-dimensional map (46a).

2. The vehicle speed limiting system according to claim 1, further comprising low-select means (45) for switching the first maximum speed limiter opening degree to a second maximum speed limiter opening degree in accordance with a change rate of the throttle grip opening degree (θA) when the throttle grip opening degree (θA) becomes small during execution of maximum speed limiting using the first maximum speed limiter opening degree, the second maximum speed limiter opening degree being smaller than the first maximum speed limiter opening degree.

3. A vehicle speed limiting system (40) having a throttle-by-wire mechanism that drives a throttle valve (28) using a motor (30),
the vehicle speed limiting system comprising:
a three-dimensional map (46a) that is provided to each of gear stages of a transmission (60) and from which to derive a target throttle valve opening degree (θB) of the throttle valve (28) on a basis of a throttle grip opening degree (θA) and an engine speed;
a throttle valve driving unit (47) that drives the motor (30) in accordance with the target throttle valve opening degree,
wherein, when a speed of a vehicle (1) is about to exceed a preset maximum speed, the throttle valve driving unit (47) drives the motor (30) in such a manner that the speed of the vehicle (1) does not exceed the preset maximum speed, irrespective of the target throttle valve opening degree (θB) derived from the three-dimensional map (46a);
wherein the vehicle speed limiting system (40) is applied to an engine (54) having a plurality of cylinders, the engine (54) is configured to change a number of cylinders being operated (S) by stopping at least one of the plurality of cylinders in accordance with a state of an operation of the vehicle (1), a plurality of motors (63A, 63B and 63CD) that drives the throttle valve (67) and that is equal in number to a number of stages of change of the number of cylinders being operated (S) is provided, and the vehicle speed limiting system (40) sets a target throttle valve opening degree (THVm) in accordance with the number of cylinders being operated (S) when the current vehicle speed (Vs) reaches a preset set maximum vehicle speed (Vm), and uses the target throttle valve opening degree (THVm) to control the plurality of motors (63A, 63B and 63CD).

4. The vehicle speed limiting system according to claim 3, wherein a maximum speed limit target torque (Qm) in which the current vehicle speed (Vs) reaches the set maximum vehicle speed (Vm) is operated, then the maximum speed limit target torque (Qm) is converted into a target throttle grip opening degree (THGm) and then the target throttle valve opening degree (THVm) is calculated as a value allocated to the number of cylinders being operated (S) determined by the target throttle grip opening degree (THGm).

5. The vehicle speed limiting system according to claim 4, wherein the vehicle speed limiting system (40) calculates a feedback operation amount (FB) based on a vehicle speed difference (P) between the set maximum vehicle speed (Vm) and the current vehicle speed (Vs), and an amount of variation in the vehicle speed difference, and calculates the maximum speed limit target torque (Qm) by adding a target torque current value (Qn) converted into the target throttle grip opening degree (THGm) in a previous process to the feedback operation amount (FB).

6. The vehicle speed limiting system according to claim 5, wherein the vehicle speed limiting system (40) calculates a requirement torque (Qy) of the engine (54) using a three-dimensional map having parameters that are a throttle grip opening degree (THG) detected by a throttle-grip opening degree sensor (27), an engine speed (NE) detected by an engine speed sensor (34) and a gear position (GP) detected by a gear position sensor (33), and the target torque current value (Qn) used for limiting the maximum speed is determined by low-select process for selecting a lower one of the requirement torque (Qy) and the maximum speed limit target torque (Qm).

7. The vehicle speed limiting system according to claim 6, wherein the three-dimensional map for calculating the requirement torque (Qy) has requirement torque data for preventing the current vehicle speed (Vs) from exceeding the set maximum vehicle speed (Vm) in a predetermined throttle grip opening degree region where the current vehicle speed (Vs) exceeds the set maximum vehicle speed (Vm) and a predetermined engine speed region.

8. The vehicle speed limiting system according to claim 5, wherein the feedback operation amount (FB) is calculated using a P-term coefficient (Kp) by which the vehicle speed difference (P) is multiplied and a D-term coefficient (Kd) by which an amount of variation (D) in the vehicle speed difference is multiplied, and the P-term coefficient (Kp) and the D-term coefficient (Kd) are formed with values (Kpt and Kdt) applied when the current vehicle speed (Vs) is higher than the set maximum vehicle speed (Vm) and values (Kpb and Kdb) applied when the current vehicle speed (Vs) is lower than the set maximum vehicle speed (Vm).

9. The vehicle speed limiting system according to claim 8, wherein it is set so that, when the current vehicle speed (Vs) exceeds the set maximum vehicle speed (Vm), the P-term coefficient (Kp) and the D-term coefficient (Kd) are increased, whereas, when the current vehicle speed (Vs) is lower than the set maximum vehicle speed (Vm), the P-term coefficient (Kp) and the D-term coefficient (Kd) are decreased, and it is also set so that, as the number of cylinders being operated (S) is decreased, the P-term coefficient (Kp) and the D-term coefficient (Kd) are increased.

10. The vehicle speed limiting system according to claim 4, wherein a throttle valve actual opening degree (THVj) for a cylinder being operated among the plurality of cylinders is calculated by adding the target throttle valve opening degree (THVm) to an idle opening degree for maintaining a number of revolutions of idling of the engine (54).

11. The vehicle speed limiting system according to claim 10, wherein, when the cylinder is stopped, an opening degree of the throttle valve (64) of the stopped cylinder is switched to the idle opening degree.

* * * * *